United States Patent
Amann et al.

(10) Patent No.: US 7,734,727 B2
(45) Date of Patent: Jun. 8, 2010

(54) COMMUNICATION ARRANGEMENT AND METHOD FOR COMMUNICATION SYSTEMS HAVING AN INTERACTIVE VOICE FUNCTION

(75) Inventors: Nathalie Amann, Trebeurden (FR); Laurent Strullu, Trebeurden (FR); Laurent Hue, Lannion (FR); Romaric Petion, Lannion (FR)

(73) Assignee: Siemens Aktiengesellschaft, Munich (DE)

( * ) Notice: Subject to any disclaimer, the term of this patent is extended or adjusted under 35 U.S.C. 154(b) by 1066 days.

(21) Appl. No.: 10/451,268

(22) PCT Filed: Nov. 21, 2001

(86) PCT No.: PCT/DE01/04373

§ 371 (c)(1),
(2), (4) Date: Dec. 1, 2003

(87) PCT Pub. No.: WO02/052810

PCT Pub. Date: Jul. 4, 2002

(65) Prior Publication Data

US 2004/0078442 A1    Apr. 22, 2004

(30) Foreign Application Priority Data

Dec. 22, 2000   (DE)   ................ 100 64 661

(51) Int. Cl.
G06F 15/16 (2006.01)
H04M 1/64 (2006.01)
(52) U.S. Cl. ............ 709/219; 709/203; 709/217; 379/88.01; 379/88.13; 379/88.17
(58) Field of Classification Search ........... 709/202, 709/203, 219, 228, 217; 704/260; 379/88.01, 379/88.13, 88.17
See application file for complete search history.

(56) References Cited

U.S. PATENT DOCUMENTS

| | | | | |
|---|---|---|---|---|
| 5,915,001 A | * | 6/1999 | Uppaluru | 379/88.22 |
| 6,018,710 A | * | 1/2000 | Wynblatt et al. | 704/260 |
| 6,282,511 B1 | * | 8/2001 | Mayer | 704/270 |
| 6,738,803 B1 | * | 5/2004 | Dodrill et al. | 709/218 |
| 6,745,163 B1 | * | 6/2004 | Brocious et al. | 704/260 |
| 2002/0091524 A1 | * | 7/2002 | Guedalia et al. | 704/260 |

FOREIGN PATENT DOCUMENTS

| | | |
|---|---|---|
| DE | 19856357 A | 6/2000 |
| EP | 0859500 A | 8/1998 |
| WO | WO 0102997 A1 | 1/2001 |
| WO | WO 0145354 A1 | 6/2001 |

OTHER PUBLICATIONS

Goose S. et al.; Enhancing Web Accessibility Via the Vox Portal and a Web Hosted Dynamic HTML<->VoxML Converter; Computer Networks, Elsevier Science Publishers B.V., vol. 33, No. 1-6, Jun. 2000, pp. 583-592; Amsterdam; 1389-1286; Others; 2000; NL.

* cited by examiner

*Primary Examiner*—Philip J Chea
(74) *Attorney, Agent, or Firm*—King & Spalding L.L.P.

(57) ABSTRACT

The invention relates to the processing of combined display screen-oriented and voice-oriented web page information (i(html,xml)). To this end, display screen-oriented web page information (i(html)) is processed in an internet terminal (PC) and voice-oriented web page information (i(xml)) is processed in a multimedia platform (VOX). In order to synchronize the processing of web page information that is distributed among the internet terminal and the multimedia platform, voice information (ivox) is exchanged by using voice agents (Avox) and control information (isig) and data (idat) are exchanged by using a communications agent (Asig). This results in dynamically reducing the load placed upon the multimedia platform.

9 Claims, 2 Drawing Sheets

COMMUNICATION ARRANGEMENT AND METHOD FOR COMMUNICATION SYSTEMS HAVING AN INTERACTIVE VOICE FUNCTION

CLAIM FOR PRIORITY

This application claims priority to International Application No. PCT/DE01/04373 which was published in the German language on Jul. 4, 2002.

TECHNICAL FIELD OF THE INVENTION

The present invention relates to a communication system and method having an interactive voice function, and in particular, to voice-oriented access to information on data media.

BACKGROUND OF THE INVENTION

Efforts have increasingly been made for some time now to allow voice-oriented access, as well as screen-oriented access, to information on data media. A typical scenario for such access is the visual display of web content, which can be navigated with voice commands.

The linking of voice-oriented and screen-oriented input and output requires suitable processing and conversion of the transported information in addition to the corresponding input and output devices, e.g. keyboard, screen, microphone and speakers. Processing voice information above all requires significant expenditure. Functions, such as conversion from text to voice and voice recognition, take up a large proportion of the resources required in respect of memory capacity and computing power. This is why resource-intensive functions are usually only implemented on terminals in a limited form.

SUMMARY OF THE INVENTION

The invention allows voice-oriented access to information on data media, which is not subject to the usual resource limitations.

In one embodiment of the invention, there is a voice agent provided in a multimedia platform and in an internet terminal for the direct communication exchange of voice information. A communication agent is also provided in the internet terminal for reciprocally influencing processing functions of the voice-oriented web page information and for synchronizing voice-oriented and screen-oriented web page information by transmitting control and data information. The invention has an advantage that resource-intensive voice processing functions are provided by the multimedia platform and therefore voice processing and voice-oriented access to web page information can be executed regardless of the performance of the internet terminal.

With the assistance of the communication arrangement according to the invention or the method according to the invention, the processing of voice information in the media platform, the outputting of processed voice information in the internet terminal PC and the transmission and launching of new web page information can be influenced by the exchange of control information. Converted voice information can be exchanged directly between the internet terminal and the multimedia platform. The direct exchange of control information and converted voice information ensures efficient information processing; an important aspect for voice-oriented interaction and navigation for access to web page information.

To take into account the different requirements relating to the transfer of voice information and data, separate transfer channels can be provided between the internet terminal (PC) and the multimedia platform (VOX(TTS,ASR)) for the transmission of voice information and the data and control information provided for the purposes of reciprocal synchronization. The transfer channels here can be set up by means of a connection for example based on the TCP/IP protocol, operating according to Asynchronous Transfer Mode or based on the Bluetooth standard. Separate transfer channels or different systems may have advantages in respect of optimizing transfer quality and allocating resources.

Another embodiment of the invention is the internet terminal, which is equipped with a browser for processing and interpreting web page information which is transmitted from a web server via the internet, with a voice agent for the direct communication exchange of voice information with a multimedia platform and with at least one communication agent to influence the processing functions of the voice-oriented web page information in the multimedia platform and to synchronize the processing of voice-oriented and screen-oriented web page information by transmitting control and data information.

Equipping the internet terminal according to the invention has the advantage of ensuring the processing of voice-oriented web page information and communication with the multimedia platform, without having to implement resource-intensive program structures or functions on the internet terminal.

Still another embodiment of the invention is the multimedia platform, which is equipped with a voice browser for processing and interpreting voice-oriented web page information which is transmitted from a web server via the internet, with a voice agent for the direct communication exchange of voice information with an internet terminal PC and with means for synchronizing the voice information exchanged with the internet terminal with the voice-oriented web page information transmitted from the web server. Also a program for voice recognition and/or a program for converting text to voice can be provided. The multimedia platform according to the invention can therefore manage resource-intensive processing stages, such as voice recognition and the conversion of text to voice. It can for example be advantageous with these processing functions for databases located either in the multimedia platform or in WWW servers accessible via the internet to be accessed for processing the combined screen-oriented and voice-oriented web page information. Voice recognition for a number of different languages for example requires considerable memory resources. The use of external resources on WWW servers or databases can be advantageous for reducing the load on the communication arrangement.

BRIEF DESCRIPTION OF THE DRAWINGS

The invention is described in more detail below with reference to the exemplary drawings, in which.

Identical references here refer to identical elements.

DETAILED DESCRIPTION OF THE INVENTION

Figure 1:
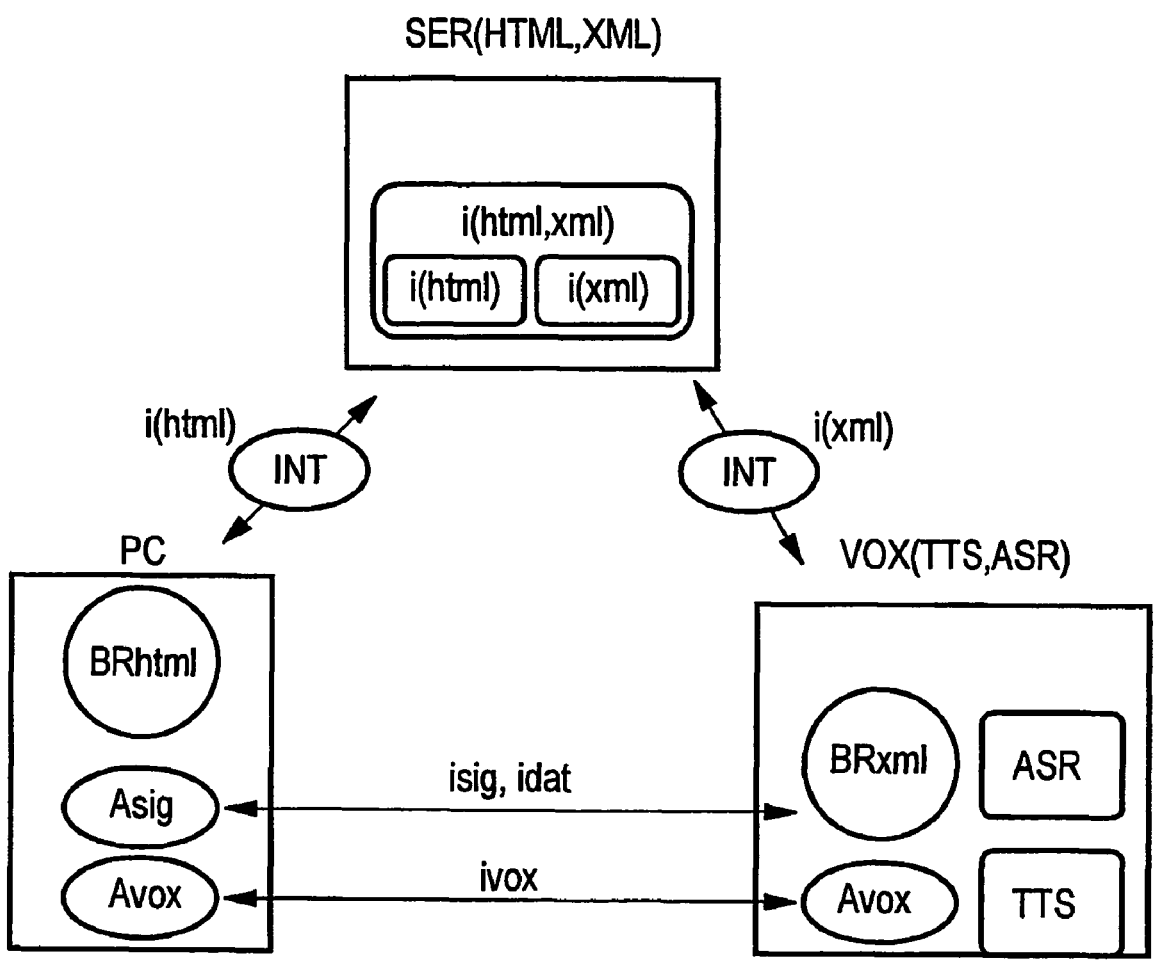
FIG. 1 shows a configuration of the arrangement according to the invention.

FIG. 1 shows a multimedia platform VOX(TTS,ASR) set up for example using a computer, the platform being connected to an internet terminal PC via a transfer channel for voice information ivox and a transfer channel for data and control information idat and isig. For this purpose the multimedia platform VOX(TTS,ASR) is equipped in each instance with corresponding connection units—not shown—for connection to the internet (INT). The transfer channels are for example set up according to the TCP/IP (protocol combining the Transmission Control Protocol (TCP) and the Internet Protocol (IP)) or the H.323 protocol (standard for internet voice transfers). In a preferred embodiment the multimedia platform is positioned in spatial proximity to the access server of the internet service provider—not shown—via which the internet terminal PC is connected to the internet INT. With such a position the transfer distance is relatively short, with the result that the voice quality of the voice information ivox exchanged between the internet terminal PC and the multimedia platform VOX(TTS,ASR) can be verified and controlled. The voice information ivox here is not routed via extensively branched connections, such as for example longer paths on the internet INT, the quality of which is outside the control of the internet service provider. The multimedia platform VOX(TTS,ASR) and the internet terminal PC are each provided with a voice agent Avox to control the exchange of voice information ivox. The internet terminal PC is also equipped with a communication agent Asig, which allows the transmission of control information isig or data to be processed idat. The internet terminal is provided with a browser BRhtml for processing and interpreting web page information. The multimedia platform VOX(TTS,ASR) is equipped with programs for voice recognition ASR for processing voice information ivox and for converting text to voice TTS and with a voice browser BRxlm for processing and interpreting voice-oriented web page information i(xml).

The internet terminal PC and the multimedia platform VOX(TTS,ASR) can be connected by a connection set-up initialized by the internet terminal PC via the internet (INT) to a web server SER(HTML,XML). Combined screen-oriented and voice-oriented web page information i(html,xml) is transmitted from the web server SER(HTML,XML). At present such combined screen-oriented and voice-oriented web page information i(html,xml) comprises separate screen-oriented i(html) and voice-oriented i(xml) components or source codes, which can be called up separately and transmitted separately. The voice-oriented components of the web page information i(xml) are predominantly programmed in an XML (extensible markup language) language, which supports voice applications, e.g. VoxML™, VoiceXML™ or DialogML™.

The screen-oriented component i(html) can for example be created using the html (hypertext markup language) programming method and generally contains references to the voice-oriented component i(xml), which allow switching from processing the screen-oriented component i(html) to processing the voice-oriented component i(xml). The browser BRhtml installed on the internet terminal PC is used not only to process and interpret the screen-oriented component i(html) but also to interpret the references to the voice-oriented component i(xml) and where necessary to initialize the transmission of control information isig and/or data idat for the transition to processing or the outputting of voice information ivox. This is why the term parser is also used in English language literature instead of browser. Efforts are being made to combine both components in one source code. In this case the arrangement according to the invention is adapted so that either the internet terminal PC and the multimedia platform VOX(html,xml) are provided with browsers, which can process and interpret the same source code combining screen-oriented and voice-oriented web page information or only one browser is provided in the internet terminal PC, which is supplemented where necessary by an additional communication agent Asig in the multimedia platform VOX(HTML, XML).

Figure 2:
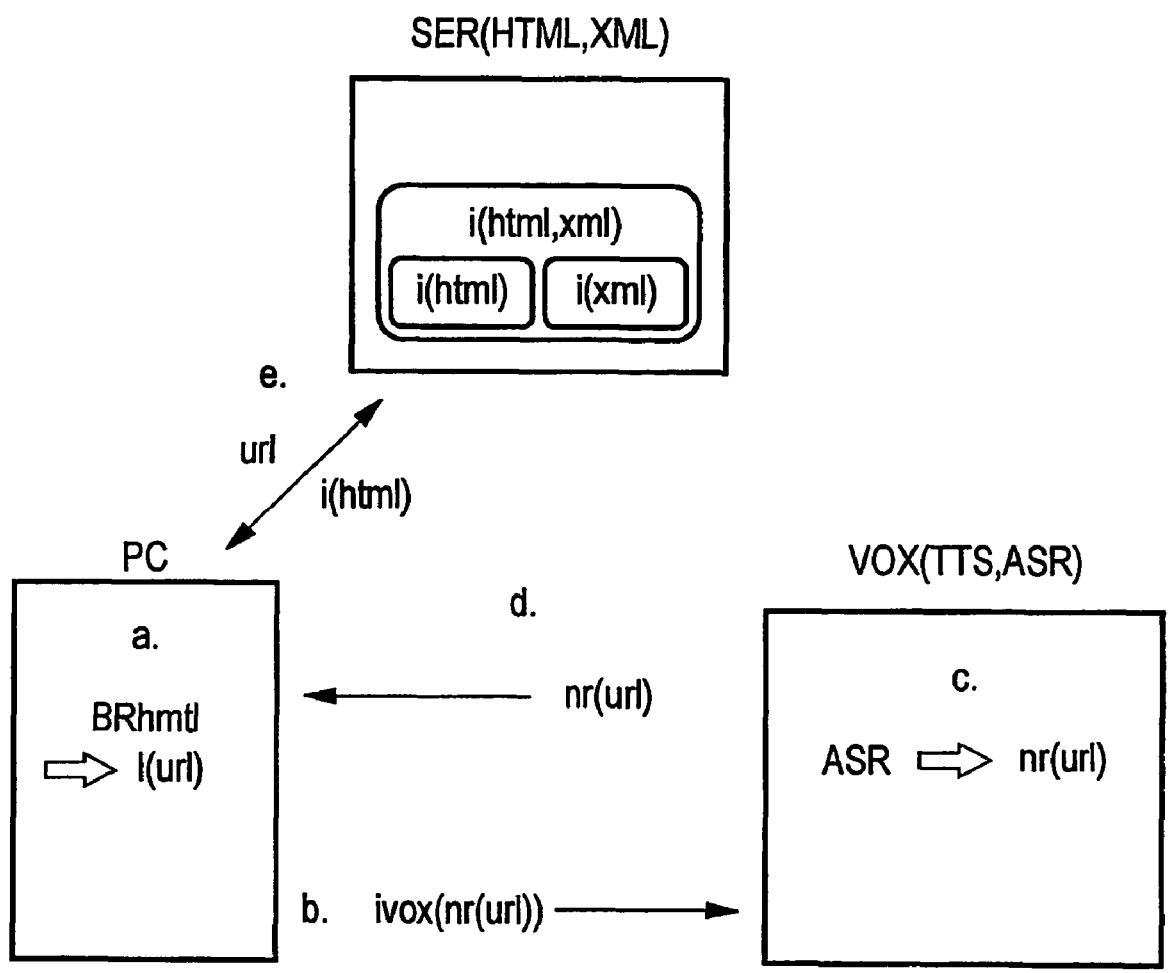
FIG. 2 shows an exemplary set-up for access to web page information using a voice command.

At the start of the method according to the invention, the screen-oriented component i(html) of screen-oriented and voice-oriented web page information i(html,xml) supplied on a World Wide Web server SER(HTML,XML) is transmitted to an internet terminal PC. A message is sent from the internet terminal PC via a transmission channel for control information isig and data idat, signaling the start of the internet session and transmitting the address of the voice-oriented component i(xml) of the screen-oriented and voice-oriented web page information i(html,xml). The voice-oriented component is then transferred from the WWW sever SER(HTML, XML) to a multimedia platform VOX(TTS,ASR). The processing and interpreting of the screen-oriented component i(html) and the voice-oriented component i(xml) by a browser BRhtml of the internet terminal PC or a voice browser BRxml of the multimedia platform VOX(TTS,ASR) are synchronized by the exchange of control information isig. Voice information ivox is exchanged directly via a transfer channel provided for this purpose by means of voice agents Avox, e.g. in order to be processed with a program for voice recognition ASR or to be output with devices provided for this purpose with the internet terminal PC, e.g. speakers. For example, in FIG. 2, a possible set-up for the launch of new combined screen-oriented and voice-oriented web page information i(html,xml) is shown during an internet session by means of a voice command ivox (nr(url)). It is assumed here for purposes of illustration that a list l(url) of such web page information is displayed via the screen-oriented output medium, from which a selection can be made.

The individual stages of the set-up are shown below. The processing stages in which a computer program processes data, are shown by solid arrows and the transmission of data or information by line arrows.

a. During an internet session the internet terminal PC displays a list l(url) of combined screen-oriented and voice-oriented web page information i(html,xml) e.g. on a screen using the browser BRhtml.

b. An entry in the list l(url) is selected by means of a voice command ivox(nr(url)). The selected entry is identified for example by its number nr. The voice command ivox(nr (url)) is transmitted using the voice agent Avox to the multimedia platform VOX(TTS, ASR).

c. The program for voice recognition ASR converts the voice command ivox(nr(url)) to text information nr(url) on the multimedia platform VOX(TTS, ASR).

d. The text information nr(url) is transmitted via the channel for the transfer of data and control information to the internet terminal PC.

e. The browser BRhtml of the internet terminal PC uses the text information nr(url) to identify the address url of the required web page information and accesses it via the internet (INT). Web page information i(html) is then transmitted to the internet terminal PC.

The invention is not restricted to the example but can be used for the further processing and conversion of voice-oriented information to screen-oriented information and vice versa, e.g. for voice conversions, voice recognition, navigation through web page information using voice commands, voice input and output, etc., with the multimedia platform VOX(TTS,ASR) being equipped or supplemented with the corresponding data processing programs or functions and conversion programs or functions.

The invention claimed is:

1. A communication arrangement, comprising:

a web server storing screen-oriented and corresponding voice-oriented web page information, the web server configured for connection to a multimedia platform and an internet terminal located separately from the multimedia platform, the internet terminal including a browser for acquiring and processing the screen-oriented web page information from the web server, and the multimedia platform including a browser for acquiring and processing the voice-oriented web page information from the web server;

at least one voice agent in the multimedia platform and in the internet terminal, the at least one voice agent in the multimedia platform and the at least one voice agent in the internet terminal are connected for communication exchange of voice information; and at least one communication agent in the internet terminal for reciprocal influencing of processing functions of the voice-oriented web page information and for synchronizing the processing of the voice-oriented by the internet terminal and the processing of the screen-oriented web page information by the multimedia platform by transmission of control and data information;

wherein the processing of the screen-oriented web page information by the internet terminal, the processing of the voice-oriented web page information by the multimedia platform, and the communication exchange of voice information between the internet terminal and the multimedia platform allow the internet terminal to provide a user both screen-oriented access and voice-oriented access to web page information without the need to process voice-oriented web page information at the terminal itself.

2. The communication arrangement according to claim 1, wherein separate transfer channels are provided between the internet terminal and the multimedia platform for the transmission of the voice information and the data and control information provided for reciprocal synchronization.

3. The communication arrangement according to claim 1, wherein one of the transfer channels is set up by a connection based on TCP/IP protocol, operating according to Asynchronous Transfer Mode or based on Bluetooth standard.

4. An internet terminal, comprising at least one processor performing functions embodied by the following components:

a browser for acquiring screen-oriented web page information from a web server via the internet and for processing the acquired information;

a communication agent for triggering a browser of a multimedia platform located separately from the internet terminal to acquire corresponding voice-oriented web page information from said web server and for exchanging control and data information to synchronize the processing of the voice-oriented web page information acquired by the multimedia platform with the processing of the screen-oriented web page information acquired by the internet terminal; and a voice agent for communication exchange of voice information between the multimedia platform and the internet terminal;

wherein the processing of the screen-oriented web page information by the internet terminal, the processing of the voice-oriented web page information by the multimedia platform, and the communication exchange of voice information between the internet terminal and the multimedia platform allow the internet terminal to provide a user both screen-oriented access and voice-oriented access to web page information without the need to process voice-oriented web page information at the terminal itself.

5. A method for processing combined screen-oriented and voice-oriented web page information, comprising:

transmitting at least the screen-oriented web page information from a web server to an internet terminal for processing by the internet terminal, and transmitting at least the voice-oriented web page information from the web server to a multimedia platform for processing by the multimedia platform, the multimedia platform located separately from the internet terminal;

exchanging voice information between a voice agent of the internet terminal and a voice agent of the multimedia platform, the voice information being generated by at least one of (a) the internet terminal from user voice input and (b) the multimedia platform using the voice-oriented web page information; and transmitting control and data information between the internet terminal and the multimedia platform to influence processing functions of the voice-oriented web page information in the multimedia platform and synchronizing the processing of the voice-oriented and the screen-oriented web page information;

wherein the processing of the screen-oriented web page information by the internet terminal, the processing of the voice-oriented web page information by the multimedia platform, and the communication exchange of voice information between the internet terminal and the multimedia platform allow the internet terminal to provide a user both screen-oriented access and voice-oriented access to web page information without the need to process voice-oriented web page information at the terminal itself.

6. The method according to claim 5, wherein the voice information and the data and control information provided for reciprocal synchronization are transmitted via separate transfer channels between the internet terminal and the multimedia platform.

7. The method according to claim 5, wherein the voice information and/or the data and control information provided for reciprocal synchronization are transmitted via a transfer channel based on TCP/IP protocol, operating according to Asynchronous Transfer Mode or based on Bluetooth standard.

8. The method according to claim 5, wherein components of the processing of the combined screen-oriented and voice-oriented web page information are executed in the multimedia platform by voice recognition and/or conversion from text to voice.

9. The method according to claim 5, wherein during the processing of the combined screen-oriented and voice-oriented web page information databases located either in the multimedia platform or in WWW servers accessible via the interne are accessed.

* * * * *